(12) United States Patent
Kim et al.

(10) Patent No.: US 9,266,295 B2
(45) Date of Patent: Feb. 23, 2016

(54) METHOD AND DEVICE FOR FORMING REFLECTOR IN LIGHT EMITTING DEVICE PACKAGE

(71) Applicant: Samsung Electronics Co., Ltd., Suwon-si (KR)

(72) Inventors: Tae Jun Kim, Hwaseong-si (KR); Sang Bok Yun, Suwon-si (KR); Min Young Son, Asan-si (KR); Choong Hwan Kwon, Icheon-si (KR); Sung Ho Park, Icheon (KR)

(73) Assignee: SAMSUNG ELECTRONICS CO., LTD., Yeongtong-gu, Suwon-si, Gyeonggi-do (KR)

( * ) Notice: Subject to any disclaimer, the term of this patent is extended or adjusted under 35 U.S.C. 154(b) by 462 days.

(21) Appl. No.: 13/714,469

(22) Filed: Dec. 14, 2012

(65) Prior Publication Data

US 2013/0154136 A1   Jun. 20, 2013

(30) Foreign Application Priority Data

Dec. 16, 2011   (KR) .................. 10-2011-0136320

(51) Int. Cl.
    *B29C 45/02*   (2006.01)
    *B29D 11/00*   (2006.01)

(52) U.S. Cl.
    CPC ...... *B29D 11/0074* (2013.01); *B29D 11/00605* (2013.01)

(58) Field of Classification Search
    CPC ............. B29D 11/00625; H01L 33/46; B29C 2045/0086; B29C 45/2704; B29C 45/561; B29C 45/5665; B29C 45/27

USPC ....................................................... 264/328.13
See application file for complete search history.

(56) References Cited

U.S. PATENT DOCUMENTS

| | | | |
|---|---|---|---|
| 4,874,451 A * | 10/1989 | Boger et al. | 156/291 |
| 5,518,389 A | 5/1996 | Nonomura et al. | |
| 5,932,160 A | 8/1999 | Lee | |
| 6,909,123 B2 | 6/2005 | Hayashimoto et al. | |
| 2006/0134825 A1* | 6/2006 | DCamp et al. | 438/106 |
| 2010/0117100 A1* | 5/2010 | Ogawa et al. | 257/88 |

FOREIGN PATENT DOCUMENTS

| | | |
|---|---|---|
| JP | 06-039882 | 2/1994 |
| JP | 10-270481 | 10/1998 |
| JP | 2006156704 A * | 6/2006 |

(Continued)

OTHER PUBLICATIONS

Kishimoto et al., JP 2006-156704 A, Derwent Abstract, Jun. 15, 2006.*

*Primary Examiner* — Galen Hauth
(74) *Attorney, Agent, or Firm* — Muir Patent Law, PLLC

(57) ABSTRACT

A method of forming a plurality of reflectors for a light emitting device (LED) package includes receiving a first fluid material at at least a first source opening of an upper mold of a transfer apparatus; passing the first fluid material through a transfer passageway of the upper mold; expelling the first fluid material from the transfer passageway through a plurality of openings in a lower internal surface of a transfer chamber of the transfer passageway; depositing the first fluid material on a lead frame, disposed on a lower mold of the transfer apparatus, through the plurality of openings; forming the first fluid material into a plurality of molded structures using the upper mold and the lower mold; and hardening each of the molded structures to form a plurality of reflectors.

18 Claims, 7 Drawing Sheets

(56) References Cited

FOREIGN PATENT DOCUMENTS

| KR | 10-1994-0001269 | | 3/1994 |
| KR | 10-0224649 | B1 | 7/1999 |
| KR | 10-2005-0090872 | | 9/2005 |
| KR | 10-2012-0118693 | | 10/2012 |

* cited by examiner

METHOD AND DEVICE FOR FORMING REFLECTOR IN LIGHT EMITTING DEVICE PACKAGE

CROSS-REFERENCE TO RELATED APPLICATION

This application claims the benefit of Korean Patent Application No. 10-2011-0136320, filed on Dec. 16, 2011, in the Korean Intellectual Property Office, the disclosure of which is incorporated herein by reference in its entirety.

BACKGROUND

The present disclosure relates to a method and apparatus for forming a reflector in a light emitting device (LED) package, and more particularly, to a method and apparatus for forming a reflector in an LED package that molds the reflector uniformly and obtains a desired view angle by adjusting a height of the reflector.

A light emitting device (LED) is a semi-conductor light emitting apparatus that emits light when a current flows. The LED may have features of a long life-span, a low power consumption, a fast response speed, an excellent initial operation, and the like and thus, may be widely applied to a lighting device, a headlight and a courtesy light of a car, an electronic display board, a backlight of a display device, and the like. The number of fields that use the LED has increased.

Recently, the LED is used as a light source of various colors. As the demand for a high power and high luminance LED, such as a white LED for lighting and the like, increases, research for improving the performance and reliability of an LED package has been actively conducted. To improve the performance of an LED product, an LED package that effectively extracts light, that has an excellent color purity, and that has a uniform property among products is desirable in addition to an LED with an excellent optical efficiency.

A structure of mounting an LED package on a PCB to be modularized may limit miniaturization of an LED module, and may fail to decrease a manufacturing cost of the LED module due to a high rate of error while mounting is performed at least twice. Luminance and a color of an LED package may have a deviation due to a deviation in a wavelength and luminance of one or more LEDs, a manufacturing tolerance on a structure such as a lead frame, and a process tolerance on a phosphor coating process, a lens molding process, and the like.

SUMMARY

A method and apparatus for forming a reflector for a LED package are disclosed.

In one embodiment, a method of forming a plurality of reflectors for a light emitting device (LED) package includes: receiving a first fluid material at at least a first source opening of an upper mold of a transfer apparatus; passing the first fluid material through a transfer passageway of the upper mold; expelling the first fluid material from the transfer passageway through a plurality of openings in a lower internal surface of a transfer chamber of the transfer passageway; depositing the first fluid material on a lead frame, disposed on a lower mold of the transfer apparatus, through the plurality of openings; forming the first fluid material into a plurality of molded structures using the upper mold and the lower mold; and hardening each of the molded structures to form a plurality of reflectors.

In another embodiment, a method of forming a plurality of reflectors for a light emitting device (LED) package includes: receiving a first fluid material at at least a first source opening of an upper mold of a transfer apparatus; passing the first fluid material through a transfer chamber of the upper mold; expelling the first fluid material from the transfer chamber through a plurality of openings in a lower internal surface of the transfer chamber; depositing some of the first fluid material on a lead frame disposed on a lower mold of the transfer apparatus through a first opening of the plurality of openings, and depositing some of the first fluid material on a lead frame disposed on the lower mold of the transfer apparatus through a second opening of the plurality of openings; forming the first fluid material into a plurality of molded structures by pressing the upper mold toward the lower mold; and hardening each of the molded structures to form a plurality of reflectors.

In a further embodiment, an apparatus for forming a reflector for a light emitting device (LED) package is disclosed. The apparatus includes an upper mold and a lower mold. The upper mold includes an upper-most external surface, a lower-most external surface, at least a first source opening configured to receive a first material, a transfer chamber extending from an upper internal surface of the upper mold to a lower internal surface of the upper mold, a plurality of discharge openings in the lower internal surface, the plurality of discharge openings configured to expel the first material, and a plurality of cavities, each cavity corresponding to a respective discharge opening, each cavity formed in a shape used for molding. The lower mold includes an upper-most external surface and a lower-most external surface. The lower mold is configured to support a lead frame onto which the first material is to be deposited using the transfer chamber

BRIEF DESCRIPTION OF THE DRAWINGS

These and/or other aspects, features, and advantages of the disclosure will become apparent and more readily appreciated from the following description of exemplary embodiments, taken in conjunction with the accompanying drawings of which.

DETAILED DESCRIPTION

Figure 1A:
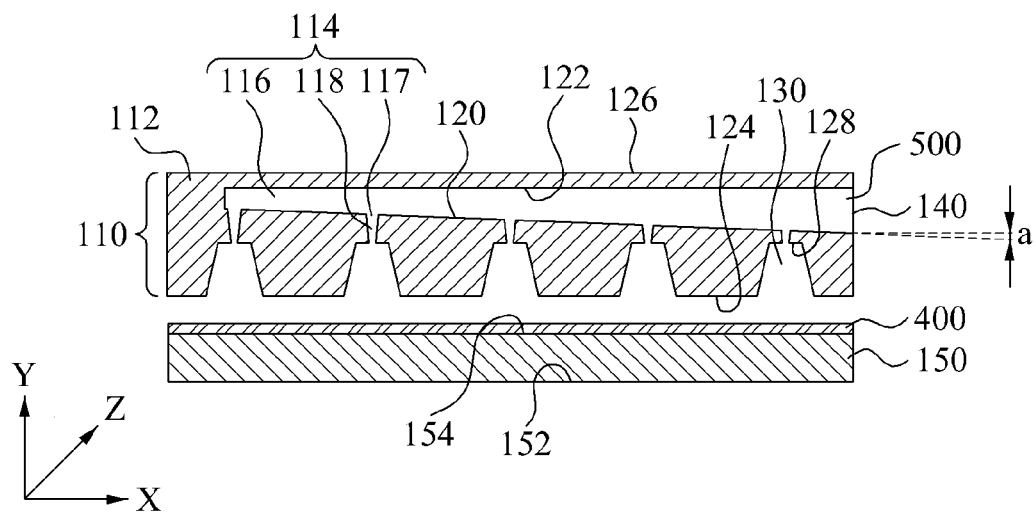
FIG. 1A is a cross-sectional view illustrating an exemplary apparatus for forming a reflector in a light emitting device (LED) package, according to one embodiment.

The present disclosure now will be described more fully hereinafter with reference to the accompanying drawings, in which various embodiments are shown. The invention may, however, be embodied in many different forms and should not be construed as limited to the embodiments set forth herein. In the drawings, the size and relative sizes of layers and regions may be exaggerated for clarity. Like numbers refer to like elements throughout.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used as a naming convention to distinguish one element from another. For example, a first opening could be termed a second opening, and, similarly, a second opening could be termed a first opening without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Embodiments described herein will be described referring to plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures have schematic properties, and shapes of regions shown in figures exemplify specific shapes of regions of elements, and the specific properties and shapes do not limit aspects of the invention.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Hereinafter, a method and apparatus for forming a reflector in a light emitting device (LED) package according to various embodiments will be described in detail with reference to the accompanying drawings.

A reflector may be formed to protect an LED chip in an LED package. In one embodiment, a reflector is formed by injecting, in a horizontal direction, a material having a high reflection rate in a visible light area and a fluidity, using transfer molding. When a plurality of reflectors are formed on a large lead frame, a distance between a starting point where a fluid material is injected, in a horizontal direction, and an end point is relatively long. Accordingly, a probability that a reflector may fail to be molded or may be defective may increase as a distance to the end point decreases. Therefore, certain embodiments additionally address this issue.

FIG. 1A is a cross-sectional view illustrating an exemplary apparatus for forming a reflector in an LED package, according to one embodiment. In FIG. 1A, an exemplary transfer apparatus 100 for transferring a material 500 is shown. Transfer apparatus includes an upper mold 110 and a lower mold 150. A lead frame 400 is also shown mounted on lower mold 150.

Upper mold 110 includes a mold body 112, transfer passageway 114, and source opening 140. Upper mold 110 has a lower-most external surface 124 and an upper-most external surface 126, which may be formed on mold body 112. Source opening 140 may be located at a side surface of upper mold 110, and may be configured to receive a fluid material to be deposited, via the upper mold 110, on a lead frame disposed on the lower mold 150. Although only one source opening 140 is shown at a side surface of upper mold 110, additional source openings may be included. In addition, one or more source openings may be included at a location other than a side surface of upper mold 110.

In one embodiment, transfer passageway 114, also referred to herein as internal transfer passageway 114, is formed inside upper mold 110 and is thus surrounded by mold body 112. Transfer passageway 114 may have a particular configuration. For example, in one embodiment, transfer passageway 114 includes a transfer chamber 116 having a lower internal surface 120, an upper internal surface 122, and a plurality of openings 117 in the lower internal surface 120. Transfer passageway 114 may additionally include a plurality of holes 118 that correspond to the plurality of openings 117, and upper mold 110 may further include a plurality of cavities 130 that correspond to the respective plurality of openings 117 and plurality of holes 118. As such, upper mold 110 may include a plurality of opening-hole-cavity groupings. In one embodiment, the opening-hole-cavity groupings are integrally formed in the upper mold 110.

In certain embodiments, for each opening-hole-cavity grouping, the hole 118 extends from the cavity (e.g., an upper-most surface 128 of the cavity) at least to the opening 117. As a result, a pathway between the source opening 140 and each cavity 130 is formed in upper mold 110. To differentiate from the source opening 140, openings 117 discussed herein may be referred to as discharge openings, or expulsion openings, as they are configured to discharge or expel a fluid material from inside the transfer chamber 116 to the cavities 130.

Each opening-hole-cavity grouping between the lower-most external surface 124 of the upper mold 110 and the upper internal surface 122 of the upper mold may have a particular cross-section. As discussed further below, in certain embodiments, each particular cross-section for respective opening-hole-cavity groupings extending away from source opening 140 in a horizontal direction differs based on a horizontal distance from the source opening 140.

In one embodiment, holes 118 have a tapered shape wherein a top end of the hole has a larger cross-sectional width than a bottom end of the hole. However, other arrangements are possible (such as a straight, un-tapered shape). Holes 118 may be formed in a circular manner, when viewed from above, or may be in other shapes as well.

Figure 1B:
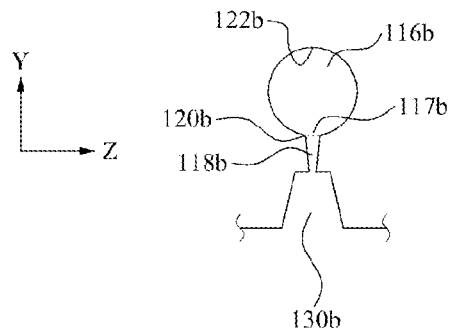
FIG. 1B is an exemplary cross-sectional view of a transfer chamber, in accordance with certain exemplary embodiments.

In one embodiment, transfer chamber 116 has a tubular shape. For example, transfer chamber 116 may extend in the horizontal direction in a linear manner, and when viewed from the side as a cross-section (e.g., from the x-direction), may have a shape that is radially symmetric (e.g., circular, square, etc.). An example cross-section of a transfer chamber 116b is shown in FIG. 1B, as is an example opening 117b, hole 118b, upper inner surface 122b, and cavity 130b. Upper inner surface 122b may extend in a linear direction (e.g., the x direction). Lower inner surface 120b may also extend in a linear direction. In one embodiment, upper inner surface 122b and lower inner surface 120b are angled with respect to each other (as shown as angle "a" in FIG. 1A), and therefore are not parallel to each other. The angles may be, for example, between 0.1 degrees and 5 degrees. As such, when viewed from a cross section such as shown in FIG. 1A, transfer chamber 116b has a tapered shape, wherein a distance from the upper inner surface 122b to the lower inner surface 120b at a first horizontal location closer to source opening 140 may be greater than a distance from the upper inner surface 122b to the lower inner surface 120b at a second horizontal location further from source opening 140.

Figure 1C:
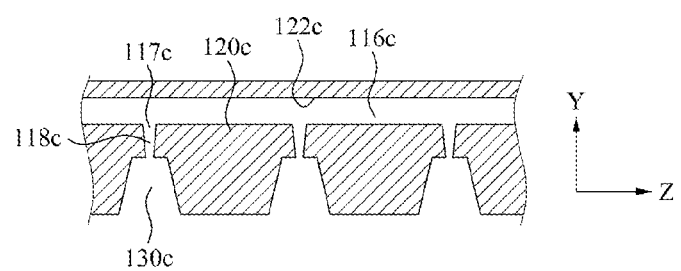
FIG. 1C is an exemplary cross-sectional view of a transfer chamber, in accordance with certain other exemplary embodiments.

In another embodiment, transfer chamber 116 has a shape that extends linearly in two directions (e.g., both the x and z directions shown in FIGS. 1A and 1C). As such, the transfer chamber 116c shown in FIG. 1C can be used to form an array of reflectors, using an array of cavities 130c, openings 117c, and holes 118c. In this example, upper inner surface 122c may extend in a planar direction (e.g., the x-z direction), and lower inner surface 120c may also extend in a planar direction. The planes may not be parallel to each other, and may be angled with respect to each other. The angles may be, for example, between 0.1 degrees and 5 degrees. In one embodiment, the planes are oriented such that when viewed from a cross section such as shown in FIG. 1A, transfer chamber 116c has a tapered shape, wherein a distance from the upper inner surface 122c to the lower inner surface 120c at a first horizontal location closer to source opening 140 may be greater than a distance from the upper inner surface 122c to the lower inner surface 120c at a second horizontal location further from source opening 140.

In one embodiment, lower-most external surface 124 of upper mold 110 is a planar surface that is parallel to upper internal surface 122 of the transfer passageway 114, at least in one direction (i.e., the x-direction as shown in FIG. 1A). In this embodiment, lower-most external surface 124 of upper mold 110 is not parallel to lower internal surface 120, but may be angled. In this embodiment, the heights of adjacent holes 118 and the locations of the openings 117 in a vertical direction vary based on the distance between the holes/openings and the source opening 140 in a horizontal direction.

In another embodiment, not shown, lower-most external surface 124 of upper mold 110 is a planar surface that may be parallel to lower internal surface 120 of the transfer passageway 114, at least in one direction (i.e., the x-direction). In this embodiment, lower-most external surface 124 of upper mold 110 is not parallel to upper internal surface 122, but may be angled. In this embodiment, the heights of adjacent holes 118 and the locations of the openings 117 in a vertical direction may not vary based on the distance between the holes/openings and the source opening 140 in a horizontal direction, but the height of the upper internal surface 122 does vary.

Lower mold 150 includes a lower-most external surface 152 and an upper-most external surface 154. In one embodiment, both lower-most external surface 152 and upper-most external surface 154 are flat, planar surfaces. Both surfaces may be parallel to each other, and may be parallel to lower-most external surface 124 of upper mold 110. As such, when the upper mold 110 and lower mold 150 are pressed toward each other, they can be used to form molded structures in the cavities 130.

Lead frame 400 may be a lead frame used to form an LED package that includes a plurality of reflectors, according to certain embodiments. Examples of LED packages that use reflectors can be seen in U.S. Pat. No. 6,909,123, published on Jan. 21, 2005, and in Korean Patent Application Publication No. 10-2012-0118693, published Oct. 29, 2012, and Korean Patent Application Publication No. 10-2005-0090872, published Sep. 14, 2005, all of which are incorporated herein in their entirety.

In operation, as described further below, a reflector material 500 may be transferred, in a fluid form, from a storage portion 600 shown in FIG. 4A, 4B, 6A, or 6B, through transfer passageway 114, and out of the holes 118, so that it may be deposited on a lead frame 114 (e.g., sprayed on by injecting the material 500 into the cavity) to form an LED package. Additional details of a method of forming reflectors on the lead frame 400 are described below.

Figure 2:
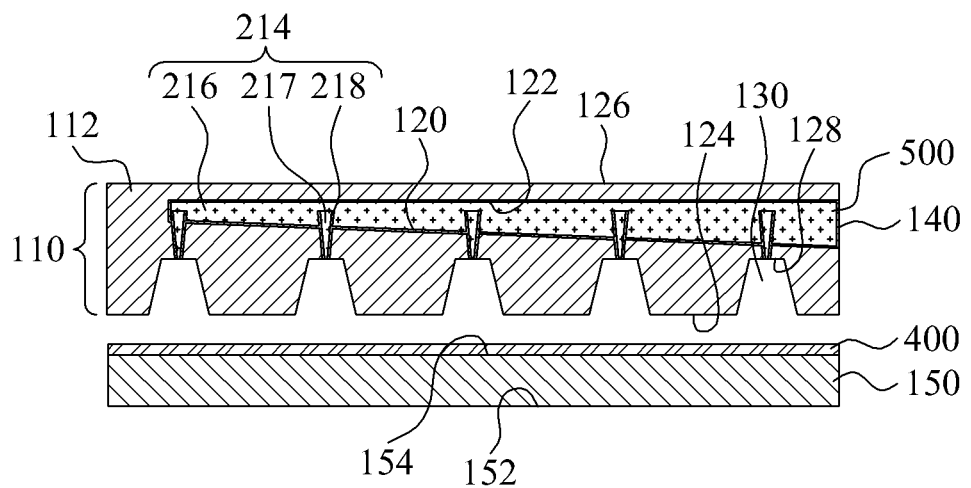
FIG. 2 is a cross-sectional view illustrating an exemplary apparatus for forming a reflector in an LED package according to another exemplary embodiment.

FIG. 2 is a cross-sectional view illustrating an apparatus for forming a reflector in an LED package according to another exemplary embodiment.

The exemplary apparatus shown in FIG. 2 includes similar elements as the apparatus shown in FIG. 1A, and for brevity, a detailed description of similarly labeled parts will not be repeated herein. As shown in FIG. 2, transfer apparatus 200 includes upper mold 110 including source opening 140, upper-most external surface 126, lower-most external surface 124, mold body 112, and cavities 130, and lower mold 150 including lower-most external surface 152 and upper-most external surface 154 for supporting lead frame 400. FIG. 2 also shows a varied transfer passageway 214 compared to FIG. 1A. Transfer passageway 214 includes transfer chamber 216, including lower internal surface 120 and upper internal surface 122. Lower internal surface 120 includes openings 217, through which holes 218 are disposed.

As shown in FIG. 2, holes 218 may be different from holes 118 of FIG. 1A. For example, rather than extending from a cavity 130 to an opening 117, holes 218 extend from a cavity (e.g., have a bottom end at a cavity) past opening 117, so that they extend into transfer chamber 216. As a result, a top end of holes 218 is located in transfer chamber 216. Holes 218 may be formed in a cone, or nozzle shape. In one embodiment, holes 218 may be nozzles inserted into upper mold 110 such that they are partly located in mold body 112 and partly located in transfer chamber 216. In one embodiment, all of the holes 218 are the same size and shape and are located at the same vertical level. Thus, in an embodiment where a lower internal surface 120 of transfer chamber 216 is angled, the distance between the bottom end of each hole 218 and an opening 217 in the lower internal surface 120 of the transfer chamber 216 in a vertical direction is smaller for holes closer to the source opening 140 than for holes further from the source opening 140. Similarly, the distance between the top end of each hole 218 and an opening 217 in the lower internal surface 120 of the transfer chamber 216 in a vertical direction is larger for holes closer to the source opening 140 than for holes further from the source opening 140. As a result, the pressure exerted on holes 218 throughout the transfer chamber 216 when transferring material 500 to a lead frame 400 can be maintained substantially evenly between the different holes 218. For example, because the diameter or cross-sectional area of the transfer chamber 216 may be relatively large at the point where the reflector material 500 is received from a storage (e.g., at source opening 140), a pressure resulting from the shape of the transfer chamber 216 may be low. Since, the diameter may be relatively small at a point farthest away from the point where the reflector material 500 is received from the storage, the pressure resulting from the shape of the transfer chamber 216 may be relative high. Thus, higher pressure due to the shape of the transfer chamber 216 at the further end of transfer chamber 216 counteracts the lower pressure due to a further distance from the source opening 140. As a result, the reflector material 500 may be discharged onto the lead frame 400 uniformly.

Figure 3:
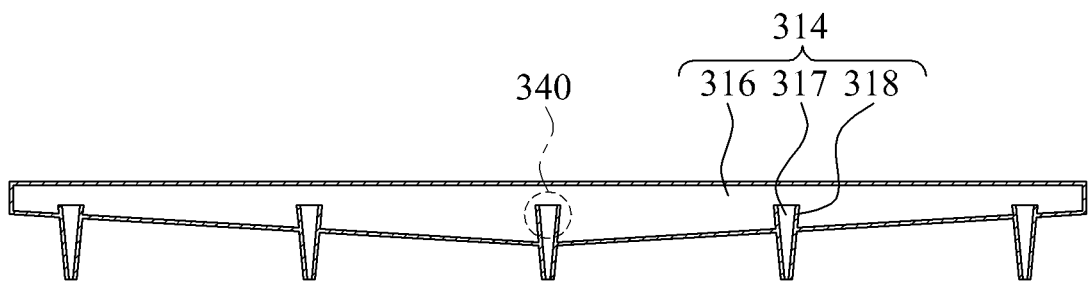
FIG. 3 is an enlarged cross-sectional view illustrating a variation on the transfer passageway in the apparatus of FIG. 2.
Figure 4A:
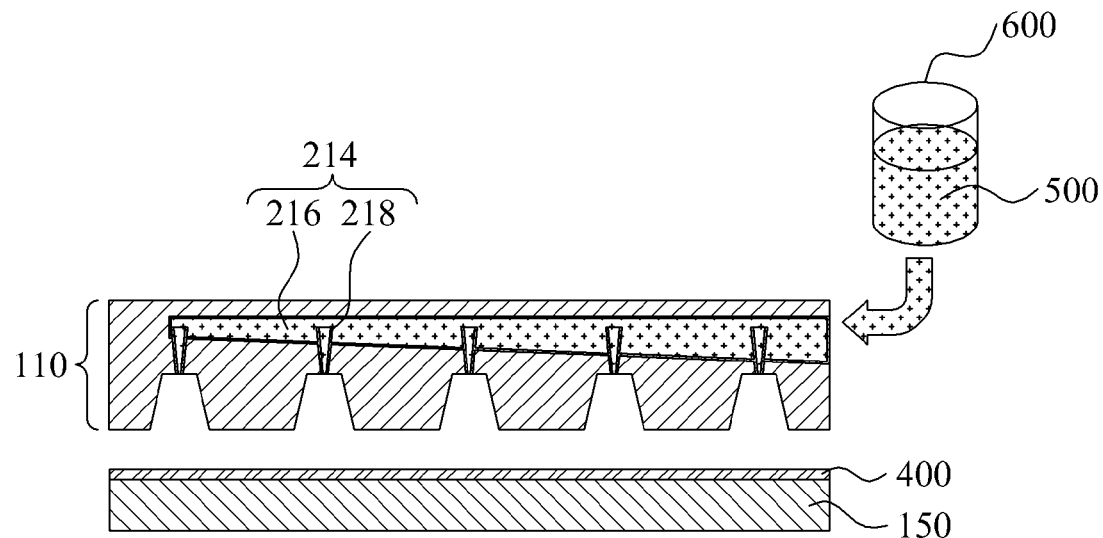
FIGS. 4A through 4D are cross-sectional views illustrating an exemplary method of forming a reflector in an LED package according to one embodiment.
Figure 4B:
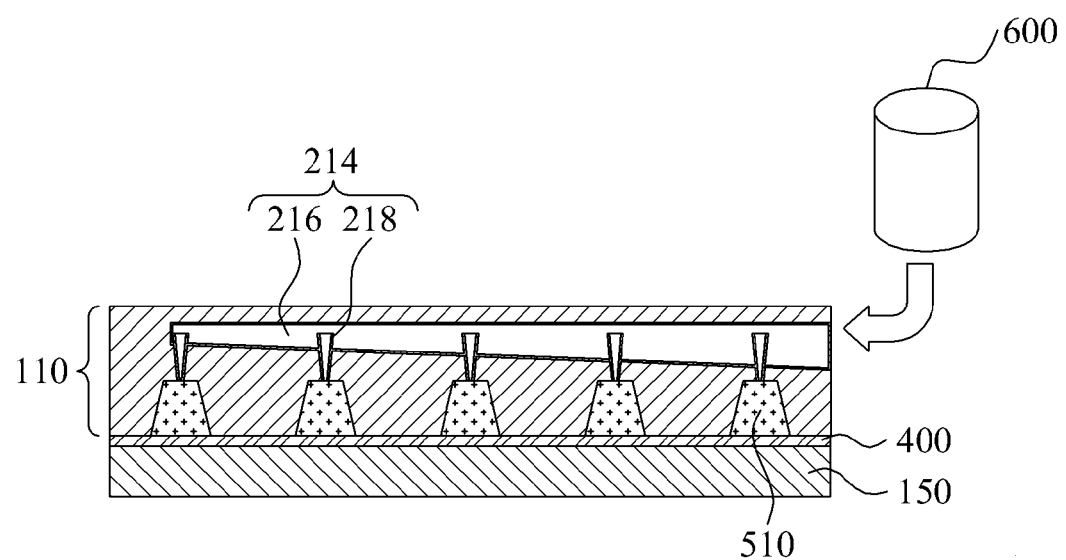
Figure 4C:
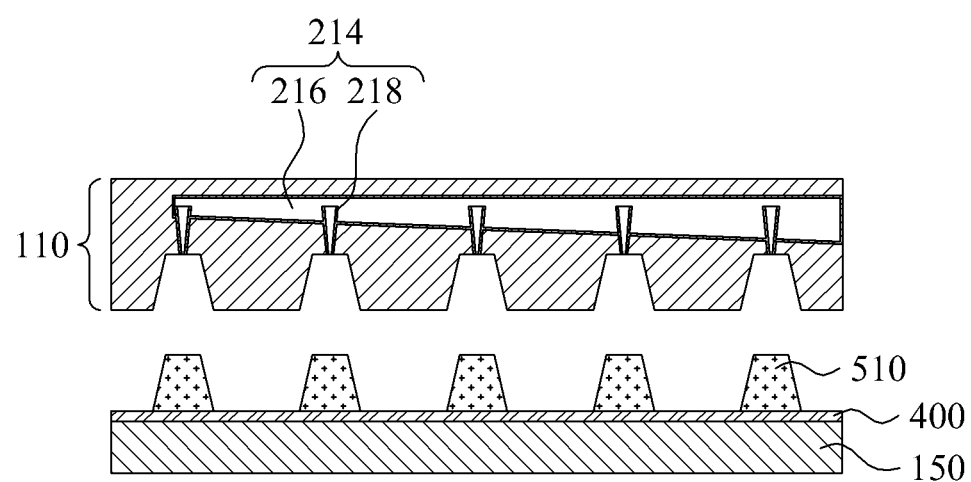
Figure 4D:
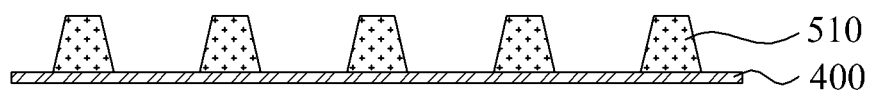

FIG. 3 depicts an example where the source opening 340 is not necessarily at a horizontal end of the transfer chamber. As shown in FIG. 3, when the reflector material 500 is emptied from a storage into a source opening 340 that is located, for example, in a central portion of transfer chamber 316, the cross-sectional height of the transfer chamber 316 may be relatively large at a central portion where the injection of the reflector material 500 into the transfer chamber 316 starts. The height may decrease as a distance to both ends of the transfer chamber 316 decreases. Because the height at the central portion of the transfer chamber 316 may be relatively large, the pressure may be relatively low. Since the height may be relatively small at the both ends of the transfer chamber 316, the pressure may be relatively high. Thus, the reflector material 500 may be discharged onto the lead frame 400 uniformly.

When a difference in internal pressure of a transfer chamber is used, a shape of the transfer chamber should not be limited to the aforementioned examples, and the shape may be variable. Also, a shape of the transfer chamber may be changed based on positions of the discharge openings and the holes. In certain embodiments, the shape of the transfer chamber and the shape, size, and orientation of the holes and the discharge openings that correspond to each cavity for forming a molded structure are different for each cavity, when viewed from a cross-sectional view, so that pressure exerted on the furthest holes from the source opening by the transfer chamber is greater than the pressure exerted on the closest holes to the source opening by the transfer chamber. Therefore, a probability that a reflector may fail to be molded or may be defective may be reduced.

As shown in the exemplary embodiments of FIGS. 2 and 3, as a distance away from the point where the injection of the reflector material 500 starts (i.e., the source opening 140) increases, portions of the transfer passageway expulsion holes (e.g., holes 218 of FIG. 2 or holes 318 of FIG. 3) disposed in the internal transfer chamber (216 or 316) may become smaller than portions of the transfer passageway expulsion holes disposed external to the internal transfer chamber.

In a case of forming a plurality of reflectors simultaneously, the plurality of reflectors may be formed uniformly in shapes, heights, and the like, using a difference in internal pressure of a transfer passageway that varies depending on a transfer chamber and expulsion holes. Also, a probability that a reflector may fail to be molded or may be defective may be reduced.

The upper mold 110 may include a pattern that forms the cavities 130. The expulsion holes 118 may be disposed at the cavities 130. The lower mold 150 may support the lead frame 400. A reflector may be formed by pressing, with the upper mold 110 and the lower mold 150, the reflector material 500 deposited on the lead frame 400 through the expulsion holes 118, and hardening the pressed reflector material 500.

Hereinafter, an exemplary method of forming a reflector using the aforementioned apparatus will be described in greater detail.

FIGS. 4A through 4D are cross-sectional views illustrating a method of forming reflectors in an LED package according to one embodiment. FIGS. 4A through 4D use the example of FIG. 2 to teach a method of forming the reflectors. However, the method could alternatively use any of the examples discussed above, or other configurations of a transfer apparatus, to achieve the disclosed results.

Referring to FIGS. 4A through 4D, the method of manufacturing a reflector in an LED package may include preparing a storage portion 600 in which a reflector material 500 is stored, and a transfer passageway 214 to receive and transfer the reflector material 500 discharged from the storage portion 600, preparing an upper mold 110 that includes the transfer passageway 214 and in which patterns are formed to create cavities for forming molded structures, preparing a lead frame 400 on which the reflector material 500 may be deposited, and a lower mold 150 to support the lead frame 400, depositing the reflector material 500 on the lead frame 400 using the transfer passageway 214, and forming a first reflector 510 by pressing the upper mold 110 and the lower mold 150.

The reflector material 500 may be discharged from the storage portion 600, and may be transferred into a transfer chamber 216 of the transfer passageway 214. The reflector material 500 transferred into the transfer chamber 216 may be discharged on the lead frame 400 through expulsion holes 218, also referred to herein as discharge holes. In one embodiment, a height or diameter of the transfer chamber 216 may decrease as a distance away from a source opening 140 where the reflector material 500 is received by the upper mold 110 increases. At a point where the reflector material 500 is received by the upper mold 110, the height or diameter of the transfer chamber 216 may be large and a pressure exerted by the transfer chamber 216 may be low. At a point farthest away from the point where the reflector material 500 is received by the upper mold 110, the diameter of the transfer chamber 216 may be small and the pressure exerted by the transfer chamber 216 may be relatively high. Thus, the reflector material 500 may be discharged on the lead frame 400 uniformly.

The holes 218 may be disposed collinearly within the transfer passageway 214. In one embodiment, as a distance away from the point where the reflector material 500 is received by the upper mold 110 increases, parts of the holes 218 disposed in the internal transfer chamber 116 may become smaller than parts of the holes 218 disposed external to the internal transfer chamber 116.

Thus, at the point where the reflector material 500 is received at the upper mold 110 (e.g., the source opening 140), the pressure exerted by the transfer chamber 216 may be relatively low and larger parts of the holes 118 may be disposed in the internal transfer chamber 116. In an area farthest away from the point where the reflector material 500 is received at the upper mold 110, the pressure exerted by the transfer chamber 216 may be relatively high and smaller parts of the holes 118 may be disposed in the internal transfer chamber 116. Thus, the reflector material 500 may be discharged on the lead frame 400 uniformly.

As a result, by using the difference in internal pressure of the transfer passageway 114, and disposing the holes 118 collinearly, the reflector material 500 may be discharged on the lead frame 400 uniformly.

The first reflector 510 may be formed by pressing, with the upper mold 110 and the lower mold 150, the reflector material 500 discharged on the lead frame 400, and hardening the pressed reflector material 500. The pressing may occur, for example, after the material 500 is expelled from the transfer chamber 216. Alternatively, the pressing may occur prior to and/or during the material 500 being expelled from the transfer chamber 216, so that the material is simultaneously expelled from the transfer chamber 216 and shaped by the cavities 130 while the upper mold 110 and lower mold 150 are pressed toward each other.

Figure 5:
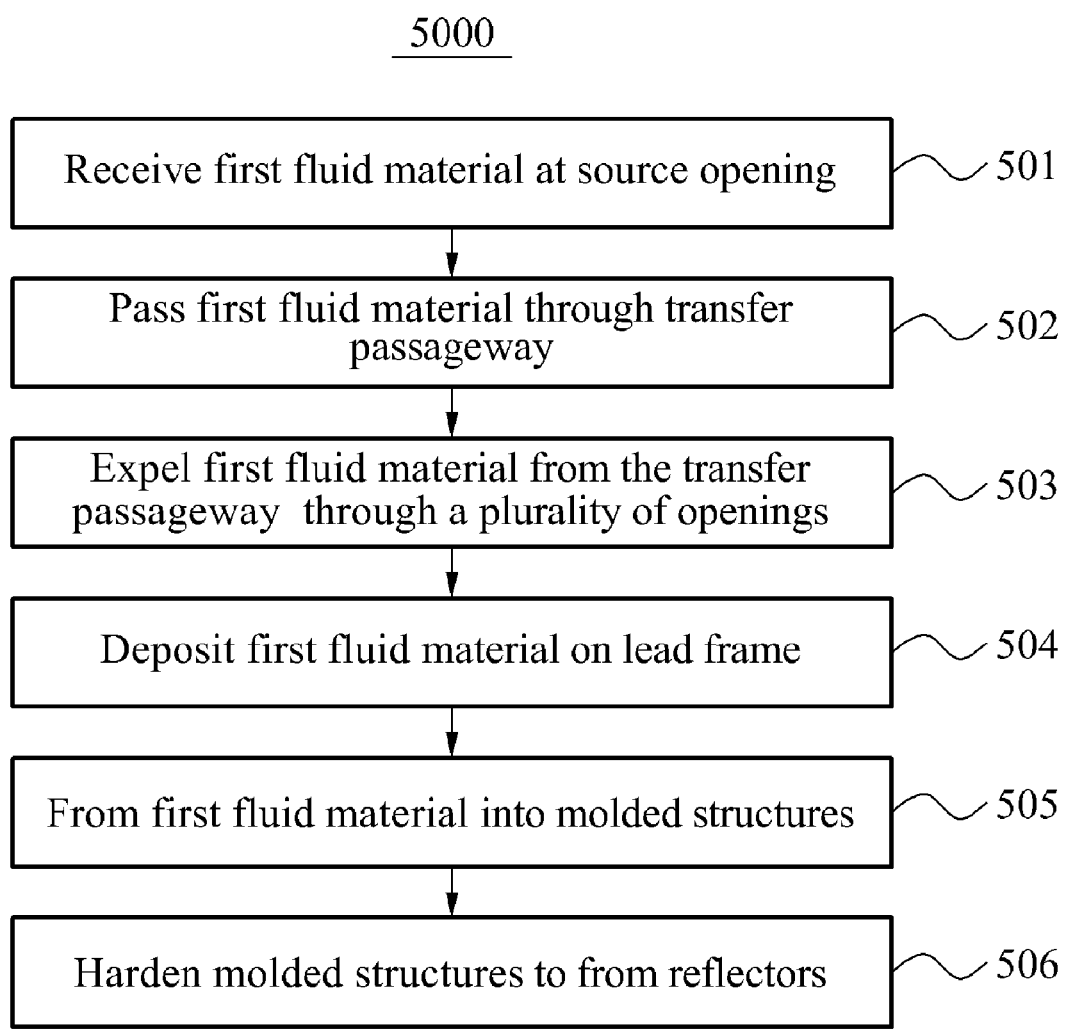
FIG. 5 is a flow chart depicting an exemplary method of forming a plurality of reflectors for a light emitting device (LED), according to certain exemplary embodiments
Figure 6A:
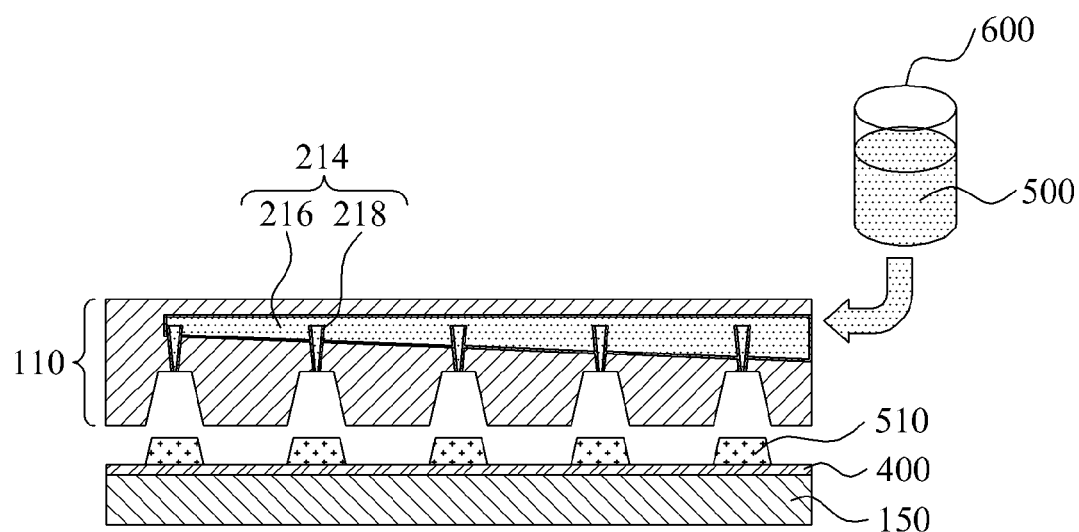
FIGS. 6A through 6D are cross-sectional views illustrating a method of forming a reflector in an LED package according to another exemplary embodiment.
Figure 6B:
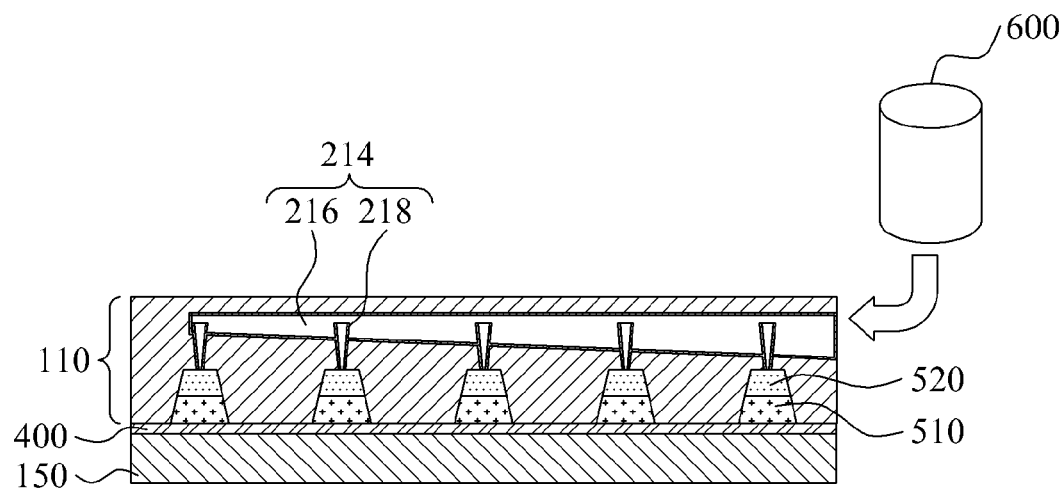
Figure 6C:
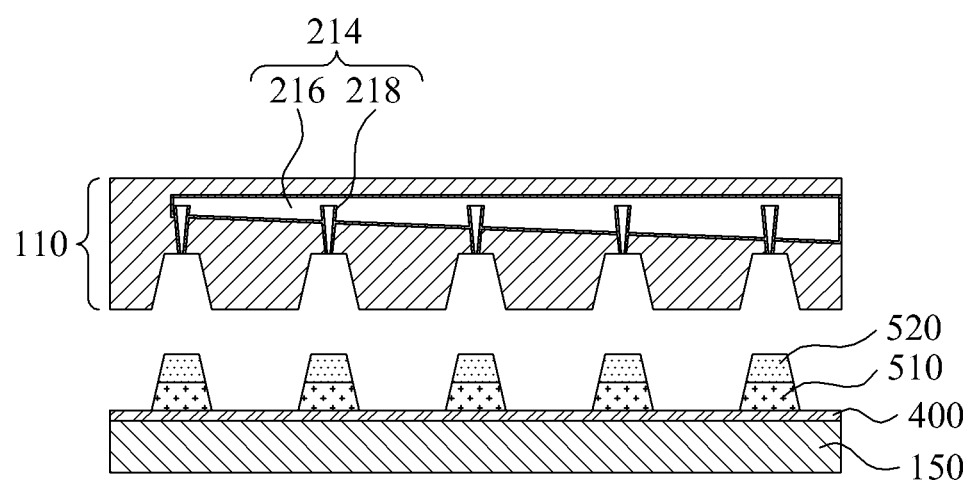
Figure 6D:
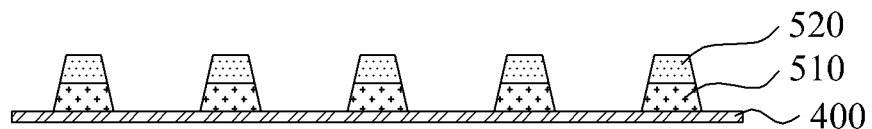

FIG. 5 is a flow chart depicting an exemplary method 5000 of forming a plurality of reflectors for a light emitting device (LED), according to certain exemplary embodiments.

As shown in FIG. 5, in step 501, a first fluid material is received at at least a first source opening of an upper mold of a transfer apparatus. For example, the fluid material may be received by a source opening (such as 140 described above) from a storage (such as 600 described above). In step 502, the first fluid material is passed through a transfer passageway of the upper mold. For example, the first fluid material may be passed through a transfer passageway (such as 114, 214, or 314 described above) that includes a transfer chamber (such as 116, 216, or 316 described above) and a plurality of openings (such as 117, 217, or 317 described above) and holes (such as 118, 218, or 318 described above).

In step 503, the first fluid material is expelled from the transfer passageway through a plurality of openings in a lower internal surface of a transfer chamber of the transfer passageway. For example, a pressure may be exerted from within the storage (e.g., through a mechanical force, gravity, and/or other means) to cause the fluid material in the transfer chamber to be expelled through a plurality of openings in the lower internal surface of the transfer chamber. In certain embodiments, as discussed above, the fluid material may also pass through holes that correspond to the openings.

In step 504, the first fluid material is deposited on a lead frame, disposed on a lower mold of the transfer apparatus, through the plurality of openings. For example, the first fluid material may be sprayed on the lead frame using holes that correspond to the openings. The plurality of openings and corresponding holes may include, for example, first, second, third, etc., opening-hole pairs.

In step 505, the first fluid material is formed into a plurality of molded structures using the upper mold and the lower mold. For example, the upper mold and lower mold may be pressed toward each other to form the molded structures. In certain embodiments, steps 503-505 may occur in different orders, or simultaneously. For example, in one embodiment, the fluid material is expelled from the transfer passageway to be deposited on a lead frame prior to pressing to form the molded structure. Then, the upper and lower molds may be pressed toward each other to form the molded structures. In another embodiment, the upper and lower molds are pressed toward each other while the fluid material is expelled form the transfer passageway and deposited on the lead frame. In this case, the molded structures are formed within the enclosed cavities formed by the pressed upper and lower molds.

In step 506, each of the molded structures are hardened to form a plurality of reflectors. The hardening may occur, for example, as a result of a temperature treatment or other hardening process. In one embodiment, the hardening occurs while the upper mold and lower mold are still pressed toward each other.

The first reflector 510 may be formed of a material, for example, such as silicone, organomodified silicone, Epoxy Mold Compound (EMC), or white epoxy. However, the material is not limited thereto.

Also, in order to increase a reflection rate with respect to light, the first reflector 510 may include titanium dioxide (TiO$_2$) or reflecting filler in the foregoing materials. The reflecting filler may include, for example, silica (SiO$_2$), alumina, aluminium carbide (Al—C), glass fiber, and the like.

According to one embodiment, a view angle may be widened by forming a height of the first reflector 510 to be low. For example, when a desired view angle is wide, depending on applications, the foregoing apparatus may be used to form the height of the first reflector 510 to be low.

In addition, a second reflector 520 may be formed on the first reflector 510, if desired. The second reflector 520 may be formed, for example, of a transparent material to maintain the wide view angle. The first reflector 510 and the second reflector 520 may be formed of a transparent material. However, the first reflector 510 and the second reflector 520 may be formed of different materials. For example, the second reflector 520 may be formed of a translucent or opaque material to narrow the view angle. The translucent or opaque material may include, for example, translucent epoxy, black epoxy, urethane, acryl, and the like.

When the second reflector 520 is formed of a translucent material, in particular, an opaque material such as a black material, a contrast in the LED package may increase, and light of vivid colors may be realized. For example, in a case in which an LED package including LED chips emitting blue, green, and red lights is used in an electric sign board, a contrast of the electric sign board may increase when the second reflector 520 is formed of a translucent or opaque material, when compared to a white material. The foregoing effect may be noticeable when all of the LED chips are turned OFF. Thus, the material used for forming the first reflector 510 and the second reflector 520 may vary depending on applications.

An exemplary process of forming a first reflector 510 and a second reflector 520 will be described with reference to FIGS. 6A through 6D.

The first reflector 510 formed on a lead frame 400 may be disposed on a lower mold 150. A reflector material may be deposited (e.g., sprayed) through a transfer passageway 214. The reflector material may be heated through an upper mold 110 and the lower mold 150, and may be hardened to manufacture the first reflector 510.

In this instance, the transfer passageway 214 may be cleaned before the second reflector 520 is formed. For example, a cleaning process may be performed in order to remove a reflector material that is left in the transfer chamber 216 and expulsion holes 218 when forming the first reflector 510. In the cleaning process, a mold releasing agent, and the like may be used to remove the left reflector material, if necessary.

In addition, by disposing a temperature controller (not shown) on an upper portion of the transfer passageway 214, a temperature may be controlled so that a reflector material may smoothly flow through the transfer chamber 216 and expulsion holes 218. Because the reflector material corresponds to a fluidic material, a flow velocity of the reflector material may vary depending on the temperature. Accordingly, the reflector material may be controlled to flow smoothly, using the temperature controller disposed, for example, on the upper portion of the transfer passageway 214.

In the examples of FIGS. 5A-5D, reflectors having two materials may be formed, using a device such as discussed in the various embodiments above. A first fluid material may be deposited on a lead frame first, may be pressed and hardened to form a first reflector portion for a plurality of reflectors, and then a second fluid material may be deposited on the first reflector portions, and pressed and hardened. As a result, a plurality of reflectors may be formed, each including two layers of materials, which may be different materials.

According to certain embodiments, an apparatus for forming a reflector in an LED package may mold the reflector uniformly, using a transfer apparatus for forming a reflector material uniformly. In a case of forming a plurality of reflectors simultaneously, the plurality of reflectors may be formed uniformly in shapes, heights, and the like, using a difference in internal pressure of a transfer passageway of the transfer apparatus. Also, a probability that a reflector may fail to be molded or may be defective may be reduced.

Although a few exemplary embodiments have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of forming a plurality of reflectors for a light emitting device (LED) package, the method including:
receiving a first fluid material at at least a first source opening of an upper mold of a transfer apparatus;
passing the first fluid material through a transfer passageway of the upper mold;
expelling the first fluid material from the transfer passageway through a plurality of openings in a lower internal surface of a transfer chamber of the transfer passageway;
depositing the first fluid material on a lead frame, disposed on a lower mold of the transfer apparatus, through the plurality of openings;
forming the first fluid material into a plurality of molded structures using the upper mold and the lower mold; and
hardening each of the molded structures to form a plurality of reflectors,
wherein depositing the fluid material on the lead frame through the plurality of openings includes passing the first fluid material through a plurality of respective holes, each hole extending at least from a respective cavity in the upper mold to a respective opening of the plurality of openings.

2. The method of claim 1, wherein:
the transfer chamber includes an upper internal surface opposite the lower internal surface, wherein the upper internal surface is not parallel to the lower internal surface.

3. The method of claim 1, wherein:
the upper mold includes a lower-most external surface, wherein the lower-most external surface of the upper mold is not parallel to the lower internal surface of the transfer chamber.

4. The method of claim 3, wherein:
the lower-most external surface of the upper mold forms an angle between 0.1 and 5 degrees with respect to the lower internal surface of the transfer chamber.

5. The method of claim 1, wherein:
the transfer chamber is enclosed by the upper mold.

6. The method of claim 1, wherein:
each hole extends from a respective cavity past a respective opening, such that a bottom end of the hole is at the respective cavity, and the opposite, top end of the hole is located in the transfer chamber.

7. The method of claim 6, wherein:
each hole is formed of a nozzle.

8. The method of claim 7, wherein:
each nozzle has the same shape and size.

9. The method of claim 6, wherein:
the distance between the bottom end of each hole and an opening in the lower internal surface of the transfer chamber in a vertical direction is smaller for holes closer to the first source opening than for holes further from the first source opening.

10. The method of claim 1, wherein:
the transfer chamber has an elongated tubular shape extending from a first end at the first source opening to a second end opposite the first source opening; and
the plurality of openings in the lower internal surface of the transfer chamber extend in a linear direction along the length of the transfer chamber.

11. The method of claim 1, further comprising:
forming the first fluid material into the plurality of molded structures by pressing the upper mold toward the lower mold.

12. A method of forming a plurality of reflectors for a light emitting device (LED) package, the method including:
receiving a first fluid material at at least a first source opening of an upper mold of a transfer apparatus;
passing the first fluid material through a transfer chamber of the upper mold;
expelling the first fluid material from the transfer chamber through a plurality of openings in a lower internal surface of the transfer chamber each opening associated with a respective cavity at a bottom of the upper mold;
depositing some of the first fluid material on a lead frame disposed on a lower mold of the transfer apparatus through a first opening of the plurality of openings, and depositing some of the first fluid material on a lead frame disposed on the lower mold of the transfer apparatus through a second opening of the plurality of openings, the first opening corresponding to a respective first cavity of the upper mold and the second opening corresponding to a respective second cavity of the upper mold;
forming the first fluid material into a plurality of molded structures by pressing the upper mold having the first and second cavities, each formed in a shape used for forming reflectors and in fluid communication with the transfer chamber, toward the lower mold; and
hardening each of the molded structures to form a plurality of reflectors.

13. The method of claim 12, further comprising:
depositing some of the first fluid material on the lead frame through a first hole that extends at least from the first opening to the first cavity in the upper mold, and
depositing some of the first fluid material on the lead frame through a second hole that extends at least from the second opening to the second cavity in the upper mold.

14. The method of claim 13, wherein:
the first hole extends from the first cavity past the first opening, such that a bottom end of the first hole is at the first cavity, and the opposite, top end of the first hole is located in the transfer chamber; and
the second hole extends from the second cavity past the second opening, such that a bottom end of the second hole is at the second cavity, and the opposite, top end of the second hole is located in the transfer chamber.

15. The method of claim 14, wherein:

the first hole is a first distance from the first source opening in a horizontal direction;

the second hole is a second distance from the source opening in a horizontal direction, the second distance being greater than the first distance; and the distance in the vertical direction between the first opening and the bottom end of the first hole is smaller than the distance in the vertical direction between the second opening and the bottom end of the second hole.

16. The method of claim 12, wherein:

the upper mold includes a lower-most external surface, wherein the lower-most external surface of the upper mold is not parallel to at least one of the lower internal surface of the transfer chamber and an opposite upper internal surface of the transfer chamber.

17. The method of claim 16, wherein:

the lower-most external surface of the upper mold forms an angle between 0.1 and 5 degrees with respect to at least one of the lower internal surface of the transfer chamber and the opposite upper internal surface of the transfer chamber.

18. A method of forming a plurality of reflectors for a light emitting device (LED) package, the method including:

receiving a first fluid material at at least a first source opening of an upper mold of a transfer apparatus;

passing the first fluid material through a transfer passageway of the upper mold;

expelling the first fluid material from the transfer passageway through a plurality of openings in a lower internal surface of a transfer chamber of the transfer passageway;

depositing the first fluid material on a lead frame, disposed on a lower mold of the transfer apparatus, through the plurality of openings;

forming the first fluid material into a plurality of molded structures using the upper mold and the lower mold; and hardening each of the molded structures to form a plurality of reflectors, wherein a cross-sectional area of the transfer passageway decreases from the first source opening to a location further from the first source opening.

\* \* \* \* \*